United States Patent Office 3,242,197
Patented Mar. 22, 1966

3,242,197
17 - HYDROXYGONA - 4,8(14), 9(10) - TRIEN - 3-ONES AND INTERMEDIATES IN THE PREPARATION THEREOF
Thomas B. Windholz, Westfield, Arthur A. Patchett, Metuchen, and John Fried, Plainfield, N.J., assignors to Merck & Co., Inc., Rahway, N.J., a corporation of New Jersey
No Drawing. Filed Oct. 1, 1962, Ser. No. 227,582
10 Claims. (Cl. 260—397.3)

This invention is concerned with novel steroid compounds and to processes of preparing the same. More particularly, it relates to novel gona-4,8(14),9-triene-3,17-diones, to novel 17-hydroxygona-4,8(14), 9-trien-3-ones and the 17β-alkanoyl esters thereof, and to processes of preparing these steroids.

The preferred gona-4,8(14),9-triene-3,17-diones which are the subject of this invention may be chemically represented by the following formula:

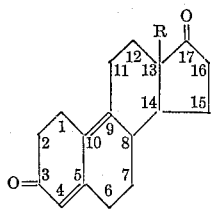

wherein R is a member selected from the group consisting of hydrogen and halogen atoms and lower alkyl, allyl, trifluoromethyl, —CN, —COOR‴, —CH₂X and —CHX₂ radicals, in which R‴ is a lower alkyl radical and X is a member selected from the group consisting of halo, —COOR‴, —OR‴ and —CN radicals (R‴ again being a lower alkyl radical). These novel steroids may be denoted as 13-R-gona-4,8(14),9-triene-3,17-diones.

The preferred 17-hydroxygona-4,8(14),9-trien-3-ones which are the subject of this invention may be chemically represented by the following formula:

wherein R is as previously described, R′ is a member selected from the group consisting of a hydrogen atom and lower alkyl, allyl, methallyl, vinyl, ethynyl, haloethynyl, —CF=CF₂ and —C≡C—CF₃ radicals, and R″ is a member selected from the group consisting of a hydrogen atom and an alkanoyl radical. These novel steroids may be denoted as 13-R-17α-R′-17-OR″-gona-4,8(14),9-trien-3-ones.

The subject 13 - R - gona-4,8(14),9-triene-3,17-dione compounds are useful synthetic compounds since they may be used to prepare the corresponding 13-R-17α-R′-17-hydroxygona-4,8(14),9-trien-3-one compounds and the 17β-alkanoyl esters thereof which possess useful progestational activity.

According to the process of this invention, the starting material utilized in the preparation of the subject gona-4,8(14),9-triene-3,17-diones is 6-oxo-1-vinyl-2,3,4,6,7,8-hexahydronaphthalene which may be represented by the following structural formula:

A method of preparing this starting material is more fully described in Example 1.

It has been found that 6-oxo-1-vinyl-2,3,4,6,7,8-hexahydronaphthalene will react with cyclopentane-1,3-diones to form the corresponding gona-4,8(14),9-triene-3,17-diones of this invention. The preferred cyclopentane 1,3-diones that are operable herein may be denoted as 2-R-cyclopentane-1,3-dione and may be chemically represented as follows:

wherein R is a member selected from the group consisting of hydrogen and halogen atoms and lower alkyl, allyl, —CF₃, —COOR‴, —CH₂X and —CHX₂ radicals, in which R‴ is an alkyl radical and X is a member selected from the group consisting of halo, —COOR‴, —OR‴ and —CN radicals. The interaction of 6-oxo-1-vinyl-2,3,4,6,7,8-hexahydronaphthalene and said cyclopentane-1,3-diones may be chemically illustrated by the following equation:

[13-R-gona-4,8(14),9-triene-3,17-dione]

In a preferred embodiment of this invention, the subject 13-R-gona-4,8(14),9-triene-3,17-diones are prepared by dissolving 6-oxo-1-vinyl-2,3,4,6,7,8-hexahydronaphthalene in an inert organic solvent containing a catalytic amount of a dialkylamine, adding the desired 2-R-cyclopentane-1,3-dione thereto and heating the mixture, preferably under reflux conditions, until the reaction is complete. The resulting 13-R-gona-4,8(14),9-triene - 3,17-dione may then be recovered by conventional laboratory techniques and converted into the corresponding 13-R-17α-R′-17-hydroxygona-4,8(14),9-trien-3-one compounds of this invention and the 17β-alkanoyl esters thereof. The organic solvent should preferably be one having a boiling point over 70° C. Among the organic solvents that are operable herein are aromatic hydrocarbons such as, for example, benzene, toluene, xylene, and the like, and aliphatic alcohols such as, for example, tert-butanol, sec-pentanol and the like, as well as mixtures of said aromatic hydrocarbons and said aliphatic alcohols. Among the dialkylamine catalysts that are operable herein are, preferably, the lower dialkylamines such as, for example, dimethylamine, diethylamine, methylethylamine, and the like.

It has been found that ketone reactive addition substances will react with the 17-keto group of the 13-R-gona-4,8(14),9-triene-3,17-dione steroids of this invention without substantially reacting with the 3-keto group therein to give a product with a 17β-hydroxyl group and a 17α-oriented addition group (R'), thereby forming the 13-R-17α-R'-17-hydroxygona-4,8(14),9-trien-3-one steroids of this invention.

Addition reactions involving the carbonyl group (>C=O) are reported in the literature. Most of these reactions are the result of nucleophilic attack on the carbonyl-carbon atom. Since the electrons of the carbonyl double bond hold together atoms of quite different electronegativity, the electrons are not equally shared. In particular, the electrons are pulled strongly toward the electronegative oxygen atom, the polarity of the carbonyl group being represented as follows:

As a result, the carbonyl carbon is electron deficient and therefore highly vulnerable to nucleophilic attack. Whatever the mechanism involved, however, addition of an unsymmetrical reagent is oriented so that the nucleophilic (basic) portion attaches itself to the carbonyl-carbon atom and the electrophilic (acidic) portion attaches itself to the carbonyl-oxygen atom.

For example, in a Grignard reagent (which may be generally designated as RMgX, wherein R is an organo group and X is a halide), the carbon-magnesium bond is a highly polar bond, carbon being negative relative to electropositive magnesium. In the addition to carbonyl compounds, therefore, the organic carbanion (R⁻) becomes attached to the carbonyl-carbon atom and the electrophilic magnesium to the carbonyl-oxygen atom.

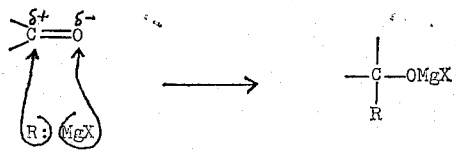

Accordingly, the 17-keto group of the instant 13-R-gona-4,8(14),9-triene-3,17-diones has been found to undergo addition of Grignard reagents wherein the organo group is selected from the class consisting of lower alkyl, allyl, methallyl, ethynyl, vinyl, trifluoromethylethynyl and trifluorovinyl radicals, said organo group adding onto the 17-carbon atom. The magnesium salt of the weakly acidic alcohol that is thus produced is easily converted into the 17β-alcohol by the addition of a proton donating substance, such as, for example, the stronger acid, water.

Similar nucleophilic additions have been found to occur between reagents such as alkali metal acetylides, alkali metal haloacetylides and organolithium compounds, such as, for example, sodium acetylide, potassium acetylide, sodium chloroacetylide, potassium chloroacetylide, methyllithium, ethyllithium and the like, and the 17-keto group of the 13-R-gona-4,8(14),9-triene-3,17-diones of this invention. The nucleophilic acetylide, haloacetylide or organo group attacks the carbonyl-carbon atom and the metal adds onto the carbonyl-oxygen atom to form the corresponding salt which is in turn converted into the 17β-hydroxy compound in the presence of a proton donator.

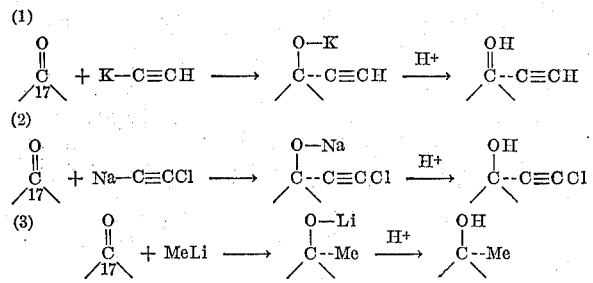

It has also been found that the instant 13-R-gona-4,8(14),9-triene-3,17-diones will undergo reduction of the 17-keto group by means of a hydride-transfer reagent such as, for example, a metal hydride (e.g., sodium borohydride and lithium aluminum hydride). The important step in such reductions is the transfer of a hydrogen, together with its pair of electrons, that is, a "hydride transfer," from the reducing agent to the carbon atom of the carbonyl group, thereby converting the carbonyl compound to a salt which may then be converted to the corresponding 17β-hydroxy compound by means of a proton donator.

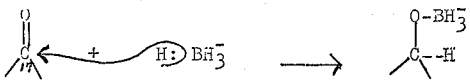

Such hydride-transfer reductions are, in effect, addition reactions to the carbonyl group in which the nucleophilic hydride (H:) attacks the carbonyl-carbon atom and the remaining electrophilic portion adds onto the carbonyl-oxygen atom.

The foregoing reaction mechanisms are preferred as an explanation of the addition reactions occurring in the conversion of the subject gona-4,8(14),9-triene-3,17-diones to the corresponding 17α-R'17-hydroxygona-4,8(14),9-trien-3-ones, although the invention is not meant to be strictly limited to any theory of action.

The solvents utilized in the foregoing addition reactions are, generally, inert organic solvents that are well-known for each type of ketone additive employed. For example, with the Grignard, organolithium and acetylide types of addition reagents, such solvents as tetrahydrofuran, alkyl ethers (e.g., dimethyl ether, methyl ethyl ether, diethyl ether and the like), and the aromatic hydrocarbons (e.g., benzene, toluene, xylene and the like) are preferred. In hydride transfer reactions, the lower alkanols such as methanol, ethanol, and the like are preferred. The solvent should obviously be void of any reactive unsaturated linkages capable of undergoing addition with the ketone additives utilized herein.

In general terms, therefore, the instant 13-R-gona-4,8(14),9-triene-3,17-diones are reacted in an inert organic solvent with a ketone reactive addition substance capable of providing a nucleophilic R' group for addition onto the carbon atom of the 17-keto group and an electrophilic portion for addition onto the oxygen atom of the 17-keto group, said R' being a hydrogen atom or a lower alkyl, allyl, methallyl, vinyl, ethynyl, haloethynyl, trifluoromethyl ethynyl and trifluorovinyl radical; the resulting salt is converted to the corresponding 17β-hydroxy compound by providing a source of protons to react with said salt, thereby forming the 13-R-17α-R'-17-hydroxygona-4,8(14),9-trien-3-ones of this invention.

The reason for the selectivity of the ketone reactive addition substance for the 17-ketonic site is not definitely known but is believed to be due to the more reactive nature of the 17-keto double bond in contrast with that of the 3-keto double bond, the stability of the latter probably being caused by the extended conjugated system of four double bonds that is present in the subject 13-R-gona-4,8(14),9-triene-3,17-diones and which may be represented as follows:

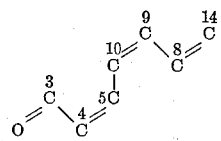

To enhance said selectivity, however, the temperature at which the ketone reactive addition substance is reacted with the 13-R-gona-4,8(14),9-triene-3,17-diones is preferably below 30° C. and, more preferably, in the range of from −30° C. to 10° C., although temperatures as low as −70° C. may be used.

The 13-R-17α-R'-17-hydroxygona - 4,8(14),9-triene-3-ones of this invention are readily converted into the corresponding 17β-alkanoyl ester by reaction with an alkanoic acid anhydride or alkanoyl halide in the presence of a tertiary amine such as pyridine. The acid anhydrides which may be used for this purpose include acetic anhydride, propionic acid anhydride, butyric acid anhydride and the like. The 17β-caproate is prepared by the reaction of the respective 17-hydroxygona-compound with caproyl halide in the presence of a tertiary amine base.

The following examples illustrate methods of carrying out the present invention but it is understood that these examples are given for purposes of illustration and not of limitation.

EXAMPLE 1

This example illustrates the preparation of 6-oxo-1-vinyl-2,3,4,6,7,8-hexahydronaphthalene, which may also be designated as 1-vinyl-$\Delta^{1(9),5(10)}$-hexalone-6, starting from 6-methoxy-α-tetralone.

Step 1.—Preparation of 1,2,3,4-tetrahydro-6-methoxy-1-naphthol

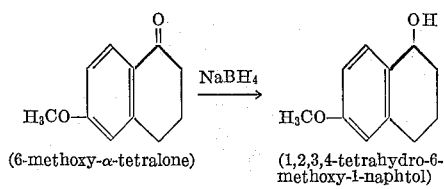

(6-methoxy-α-tetralone)   (1,2,3,4-tetrahydro-6-methoxy-1-naphtol)

Eight grams of 6-methoxy-α-tetralone, the synthesis of which has been reported by G. Stork in JACS, 69, 576 (1947), are dissolved in 320 ml. of methanol and cooled to 0° C. A freshly prepared solution of 8 g. NaBH$_4$ in 80 ml. H$_2$O is added with stirring. The resulting solution is stirred for an additional 12 hours at room temperature, neutralized with NaH$_2$PO$_4$, and the methanol removed in vacuo. The residue is extracted with ether, washed with water, dried and concentrated to a heavy oil; yield= 7.10 grams of 1,2,3,4-tetrahydro-6-methoxy-1-naphthol. The reaction of Step 1 may be represented by the above equation.

Step 2.—Preparation of 6-oxo-1-vinyl-2,3,4,6,7,8-hexahydronaphthalene

The 1,2,3,4 - tetrahydro - 6 - methoxy - 1 - naphthol obtained from Step 1 is converted to 6 - oxo - 1 - vinyl-2,3,4,6,7,8-hexahydronaphthalene substantially according to the process described in Izvest. Akad. Nauk SSSR—Otdel. Khim. Nauk, 1803 (1961). The conversion involves four steps which may be represented in flow chart form as follows:

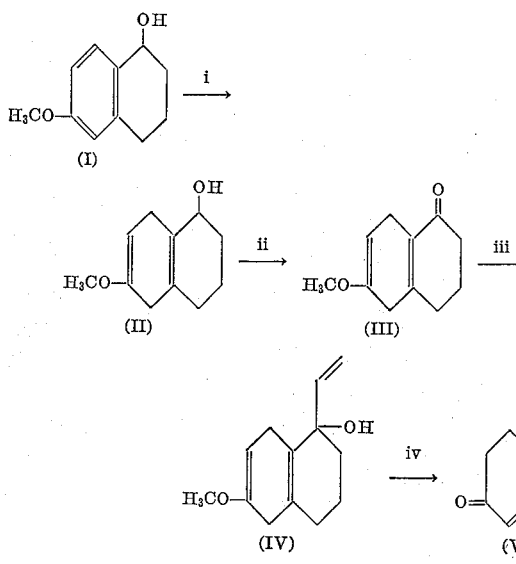

(i) Reduction of 1,2,3,4-tetrahydro-6-methoxy-1-naphthol 6.54 grams of 1,2,3,4-tetrahydro-6-methoxy-1-naphthol (I), the reduction product obtained in Step 1, are dissolved in a mixture of 160 ml. tetrahydrofuran and 160 ml. tertiary-butanol, which is then added to a round bottom flask fitted with a reflux condenser and containing 10.3 g. sodium in 390 ml. liquid ammonia. The system is purged with nitrogen gas and the mixture refluxed for 4½ hours. The flask is then cooled, 25 ml. methanol are added and the ammonia is evaporated off. The residue is concentrated in vacuo and the 1,2,3,4,5,8-hexahydro - 6 - methoxy - 1 - naphthol (II) product, which is also known as 6 - methoxy - $\Delta^{6,9}$ - hexalol, is extracted by the conventional ether-water distribution technique. The ether layer is separated and the aqueous layer is further extracted with ether. The combined ether extracts are washed with water, dried over anhydrous K$_2$CO$_3$ and concentrated in vacuo to yield 6.40 grams of (II).

(ii) Oxidation of 1,2,3,4,5,8-hexahydro-6-methoxy-1-naphthol 12 grams of aluminum isopropoxide and 6.40 grams of (II) are added to 28 ml. dry toluene under nitrogen and dissolved therein with slight heat. 16 ml. dry acetone are added and the mixture refluxed for 4½ hours. The mixture is then cooled, 12 ml. of water are added and the mixture is extracted four times with ether. The ether extracts are combined, dried over anhydrous K$_2$CO$_3$ and concentrated in vacuo to yield 6.00 g. of 3,4,5,8-tetrahydro - 6 - methoxy - 1(2H) - naphthalenone (III), also known as 6 - methoxy - 5,8 - dihydro - α - tetralone.

(iii) Preparation of vinylcarbinol

A freshly prepared solution of 16 g. vinyl bromide in 16 ml. tetrahydrofuran is added to 2.54 grams magnesium in 22 ml. tetrahydrofuran under a nitrogen atmosphere to prepare vinylmagnesium bromide (Grignard reagent). To this is added 5 grams of (III), dissolved in a mixture of 22 ml. ether and 6.3 ml. tetrahydrofuran. After 24 hours, the mixture is boiled for 1½ hours, cooled and poured into a mixture of 15 g. of ammonium chloride and 75 g. of ice. The organic layer is separated and the aqueous layer is extracted three times with ether. The extracted 1,2,3,4,5,8 - hexahydro - 6 - methoxy - 1 - vinyl-1-naphthol (IV) need not be isolated before proceeding with the next step.

(iv) Preparation of trieneone

The ether extracts of Step 2 (iii) are added to a mixture of 100 ml. of 2.5 N HCl and 20 g. ice and stirred for 4 hours at room temperature under nitrogen. The ether layer is separated and the aqueous layer extracted with ether. The combined ether extracts are washed two times with aqueous NaHCO$_3$, two times with ice cold water, dried over Na$_2$SO$_4$ and concentrated in vacuo to yield 4.10 g. of 6 - oxo - 1 - vinyl - 2,3,4,6,7,8 - hexahydronaphthalene (V), a yellow oil.

EXAMPLE 2

This example illustrates a method of preparing the cyclopentane-1,3-dione derivatives that are utilized in this invention. The method involves three steps, to wit, (1) the preparation of a triketoglyoxalate, (2) the preparation of a diketosemicarbazone, and (3) the preparation of a cyclopentadione, as illustrated more specifically immediately hereinafter with the preparation of 2-methylcyclopentane-1,3-dione.

Step 1.—Preparation of triketoglyoxalate

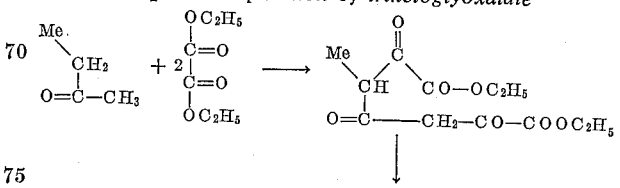

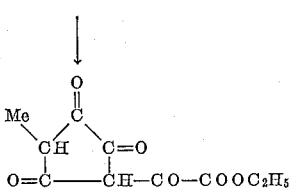

108 grams (2 moles) of fresh sodium methoxide are carefully dissolved in ice-cooled 580 ml. absolute alcohol and then cooled to 5° C. With stirring and continued cooling, a mixture of 2 g. (1 mole) of ethylmethylketone and 320 g. (2.2 moles) of diethyloxalate is added over a period of 30 minutes and then heated at 50° C. for 40 minutes. The mixture is cooled in an ice bath and, with strong stirring, a cold mixture of 55 ml. conc. $H_2SO_4$ and 55 ml. $H_2O$ is slowly added. After addition, the reaction mixture is allowed to come to room temperature and the salt filtered. The filtrate is concentrated in vacuo to about 200 ml. On cooling, a precipitate is obtained, which is recrystallized from ethyl acetate. The resulting crystalline product, 4-methyl-2,3,5-trioxocyclopentane glyoxylic acid ethyl ester, is filtered and dried; yield: 70 g.; M.P. 158–160°. The reaction of Step 1 may be represented by the above equation.

Step 2.—*Preparation of diketosemicarbazone*

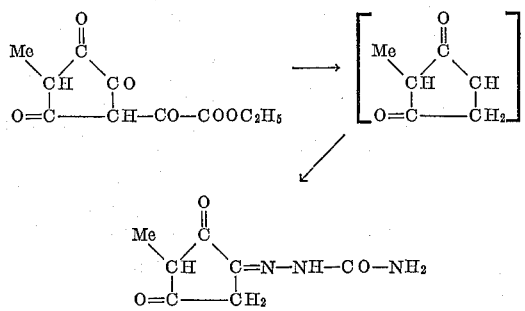

70 grams (0.31 mole) of the triketoglyoxalate obtained from Step 1 is suspended in 1050 ml. 2.5 N HCl and slowly heated with stirring to reflux. After refluxing for about 1 hour, the solution is cooled to room temperature and added to an equal volume of alcohol. At room temperature there is then added dropwise with stirring over a period of 1½ hours a solution of 53.5 g. (0.79 mole) of semicarbazide-HCl and 74 g. of Na-acetate in 490 ml. $H_2O$. A precipitate of 3-methyl-2,4-cyclopentadione-1-semicarbazone is obtained; yield: 54 g. The material has no sharp melting point, decomposing around 290° C. The reaction of Step 2 may be represented by the above equation.

Step 3.—*Preparation of 2-methylcyclopentane-1,3-dione*

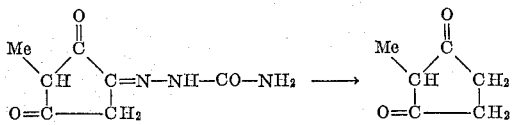

Fifty-four grams of KOH are dissolved with stirring in 540 ml. ethylene glycol and the solution heated to 130° C. Fifty-four grams of the semicarbazone obtained in Step 2 is then added gradually and with stirring and the mixture refluxed for 1½ hours. The mixture is then cooled and concentrated under a vaccum (0.5 mm.) to dryness. The residue is dissolved in water, ice-cooled and acidified to pH 3. A precipitate of 2-methylcyclopentane-1,3-dione is obtained which is filtered off and dried; yield: 27.4 g.; M.P.: 205–208° C. The reaction of Step 3 may be represented by the above equation.

EXAMPLE 3

The procedures of Example 2 are followed except that equivalent quantities of other ketones are utilized in place of the ethylmethyl ketone of Step 1 therein, thereby obtaining various derivatives of cyclopentane-1,3-dione. Accordingly, the use of other lower alkylmethyl ketones, such as propymethyl ketone, isobutylmethyl ketone, n-butylmethyl ketone and amylmethyl ketone, yields the corresponding 2-lower alkylcyclopentane-1,3-dione compounds, such as 2-ethylcyclopentane-1,3-dione, 2-isopropyl-cyclopentane-1,3-dione, 2-n-propyl - cyclopentane-1,3-dione and 2-n-butylcyclopentane-1,3-dione, respectively. Similarly, the use of 5-keto-hexene-1-

and 1,1,1-trifluoro-3-butanone

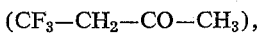

in lieu of the ethyl methyl ketone of Step 1, yields 2-allyl cyclopentane-1,3-dione and 2-trifluoromethyl-cyclopentane-1,3-dione, respectively. In like manner, the use of etherified methyl ketones having the formula $CH_3-CO-CH_2-CH_2OR''$, where $R''$ is an alkyl radical preferably having from 1 to 5 carbon atoms, such as β-methoxyethyl methyl ketone, β-ethoxyethyl methyl ketone, β-propoxyethyl methyl ketone, β-butoxyethyl methyl ketone, yields the corresponding 2-alkoxymethyl derivatives of cyclopentane-1,3-dione, such as 2-methoxymethyl-cyclopentane-1,3-dione, 2-ethoxymethyl-cyclopentane-1,3-dione, 2-propoxymethyl-cyclopentane-1,3-dione, 2-butoxymethyl-cyclopentane-1,3-dione and 2-amyloxymethyl-cyclopentane-1,3-dione, respectively.

EXAMPLE 4

This example illustrates a method of preparing 2-difluoromethyl-cyclopentane-1,3-dione. Ten grams of cyclopentane-1,3-dione are dissolved in a mixture of tetrahydrofuran and tertiary butanol followed by the addition of 10 g. of potassium-t-butoxide. The mixture is cooled to 0° C. and a stream of $CHClF_2$ is passed into the mixture for 5 hours with constant cooling. The reaction product is poured onto excess ice water and acidified to pH 2.5 followed by repeated chloroform extractions. The chloroform extracts are combined, washed with a small amount of ice water, dried and concentrated in vacuo to yield 6.2 g. of 2-difluoromethyl-cyclopentane-1,3-dione.

EXAMPLE 5

This example illustrates the preparation of 13-methyl-gona-4,8(14),9-triene-3,17-dione from the interaction of 6-oxo-1-vinyl-2,3,4,6,7,8-hexahydronaphthalene and 2-methylcyclopentane-1,3-dione. The reaction may be represented as follows:

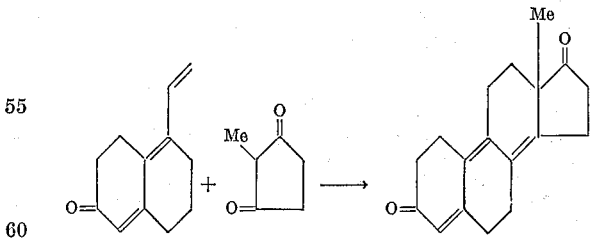

6.50 grams of 6-oxo-1-vinyl-2,3,4,6,7,8-hexahydronaphthalene are dissolved in a mixture of dry xylene (27 ml.) and tertiary-butanol (13.5 ml.) and to this are added 4.05 g. of 2-methyl-cyclopentane-1,3-dione and 1.81 ml. of diethylamine. The resulting mixture is refluxed for 40 hours and then concentrated in vacuo. The residue is dissolved in methylene chloride, washed successively with aqueous $NaHCO_3$, dilute HCl and water, dried and concentrated in vacuo. The resulting concentrate is chromatographed on acid washed alumina and eluted with benzene-chloroform mixtures to yield 1.6 g. of 13-methyl-gona-4,8(14),9-triene-3,17-dione, M.P. 130–131° C. Analysis of the product found C=80.90%, H=7.60%; calculated C=80.56%, H=7.51%. U.V. absorption data revealed: λ max. =3500; E=24,200.

EXAMPLE 6

Using the same procedure as in Example 5, 6-oxo-1-vinyl-2,3,4,6,7,8-hexahydronaphthalene is reacted with the cyclopentane-1,3-dione derivatives listed in Table I to yield the corresponding gona-4,8(14),9-triene-3,17-dione compounds.

TABLE I

| Cyclopentane-1,3-dione Derivative | Corresponding Gona-4,8(14),9-triene-3,17-dione |
|---|---|
| 2-Ethyl-cyclopentane-1,3-dione | 13-Ethyl-gona-4,8(14),9-triene-3,17-dione. |
| 2-Isopropyl-cyclopentane-1,3-dione | 13-Isopropyl-gona-4,8(14),9-triene-3,17-dione. |
| 2-n-Propyl-cyclopentane-1,3-dione | 13-n-Propyl-gona-4,8(14),9-triene-3,17-dione. |
| 2-n-Butyl-cyclopentane-1,3-dione | 13-n-Butyl-gona-4,8(14),9-triene-3,17-dione. |
| 2-Allyl-cyclopentane-1,3-dione | 13-Allyl-gona-4,8(14),9-triene-3,17-dione. |
| 2-Difluoromethyl-cyclopentane-1,3-dione. | 13-Difluoromethyl-gona-4,8(14),9-triene-3,17-dione. |
| 2-Trifluoromethyl-cyclopentane-1,3-dione. | 13-Trifluoromethyl-gona-4,8(14),9-triene-3,17-dione. |
| 2-Methoxymethyl-cyclopentane-1,3-dione. | 13-Methoxymethyl-gona-4,8(14),9-triene-3,17-dione. |
| 2-Ethoxymethyl-cyclopentane-1,3-dione. | 13-Ethoxymethyl-gona-4,8(14),9-triene-3,17-dione. |
| 2-Pentoxymethyl-cyclopentane-1,3-dione. | 13-Pentoxymethyl-gona-4,8(14),9-triene-3,17-dione. |

In accordance with the above procedures, gona-4,8(14),9-triene-3,17-dione is prepared from the interaction of 6-oxo-1-vinyl-2,3,4,6,7,8-hexahydronaphthalene and cyclopentane-1,3-dione.

This example illustrates the preparation of 13-R-gona-4,8(14),9-triene-3,17-dione wherein R is a hydrogen atom or a lower alkyl, allyl, difluoromethyl, trifluoromethyl and alkoxymethyl radical.

EXAMPLE 7

This example illustrates the preparation of 13-methyl-17α-chloroethynyl-17-hydroxygona-4,8(14),9-trien-3-one. The reaction may be represented as follows:

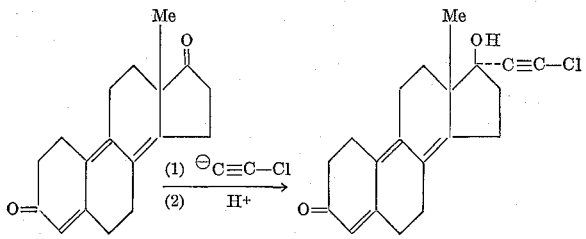

A solution of 0.144 ml. cis-dichloroethylene in 0.45 ml. dry ether is added to a solution of sodamide in 4.5 ml. liquid ammonia (prepared from 105 mg. sodium), thereby forming the chloroacetylide carbanion in situ, and the resulting mixture is refluxed (circa −30° C.) for 30 minutes. To this is added a solution of 300 mg. of the 13-methyl-gona-4,8(14),9-triene-3,17-dione obtained from Example 5 in 3 ml. dry tetrahydrofuran and refluxing (circa −30° C.) is continued for 1½ hours. After cooling to room temperature, the product is poured onto a mixture of NH$_4$Cl and ice, extracted with ether and the ether extract washed with dilute HCl, aqueous NaHCO$_3$, water and then dried. The extract is then chromatographed on acid-washed alumina and eluted with benzene-chloroform mixtures to yield 150 mg. of 13-methyl-17α-chloroethynyl-17-hydroxygona-4,8(14),9-trien-3-one, M.P.: 159–160° C. Analysis of the product found C=72.97%, H=6.45%; calculated C=72.98%, H=6.39%. U.V. absorption data revealed: λ max.=3575, E=19,850.

EXAMPLE 8

Using the same procedure as in Example 7, cis-dichloroethylene is reacted with the gona-4,8(14),9-triene-3,17-dione compounds listed in Table I of Example 6 to yield, respectively, the corresponding 17α-chloroethynyl-17-hydroxygona-4,8(14),9-trien-3-one compounds tabulated in Table II.

TABLE II 13-ethyl-17α-chloroethynyl-17-hydroxygona-4,8(14),9-trien-3-one 13-isopropyl-17α-chloroethynyl-17-hydroxygona-4,8(14),9-trien-3-one 13-n-propyl-17α-chloroethynyl-17-hydroxygona-4,8(14),9-trien-3-one 13-n-butyl-17α-chloroethynyl-17-hydroxygona-4,8(14),9-trien-3-one 13-allyl-17α-chloroethynyl-17-hydroxygona-4,8(14),9-trien-3-one 13-difluoromethyl-17α-chloroethynyl-17-hydroxygona-4,8(14),9-trien-3-one 13-trifluoromethyl-17α-chloroethynyl-17-hydroxygona-4,8(14),9-trien-3-one 13-methoxymethyl-17α-chloroethynyl-17-hydroxygona-4,8(14),9-trien-3-one 13-ethoxymethyl-17α-chloroethynyl-17-hydroxygona-4,8(14),9-trien-3-one 13-pentoxymethyl-17α-chloroethynyl-17-hydroxygona-4,8(14),9-trien-3-one In accordance with the above procedures, cis-dichloroethylene is reacted with gona-4,8(14),9-triene-3,17-dione to yield the corresponding 17α-chloroethynyl-17-hydroxygona-4,8(14),9-trien-3-one.

In accordance with the above procedures, but utilizing cis-dibromoethylene in lieu of the cis-dichloroethylene, the corresponding 17α-bromoethynyl derivatives of 13-R-17-hydroxygona-4,8(14),9-trien-3-one are prepared.

This example illustrates the preparation of 13-R-17α-haloethynyl-17-hydroxygona-4,8(14),9-trien-3-one wherein R is a hydrogen atom or a lower alkyl, allyl, difluoromethyl, trifluoromethyl and alkoxymethyl radical.

EXAMPLE 9

30-milliliters of liquid ammonia is charged into a 3-necfl flask which has been cooled in Dry Ice and fitted with a stirrer, an inlet tube and an outlet tube. 2 grams of metallic potassium in small pieces are added and acetylene is introduced until the blue color is discharged, indicating the formation of potassium acetylide. A solution of 2.5 g. of 13-n-propyl-gona-4,8(14),9-triene-3,17-dione in 15 ml. of ether and 15 ml. of benzene is added with stirring at a temperature of −60° to −70° C. Acetylene is then bubbled through the slurry for 3 hours. The Dry Ice bath is removed and the ammonia is allowed to evaporate overnight. The residue is diluted with water, filtered and the filtrate extracted with benzene. The benzene extract is dried, concentrated in vacuo, chromatographed on silica gel and eluted with ether-petroleum ether mixtures to yield 13-n-propyl-17α-ethynyl-17-hydroxygona-4,8(14),9-trien-3-one. The reaction may be illustrated as follows:

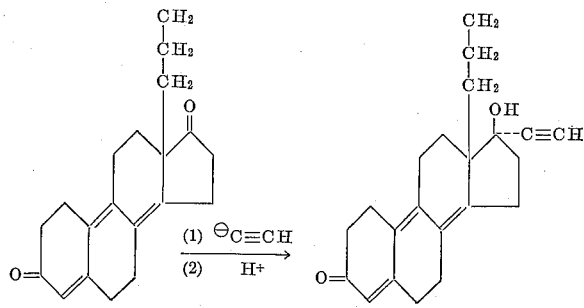

In accordance with the above procedures, but starting with the 13-methyl, 13-ethyl, 13-isopropyl and 13-butyl derivatives of gona-4,8(14),9-triene-3,17-dione in lieu of 13-n-propyl-gona-4,8(14),9-triene-3,17-dione, the corresponding 13-methyl, 13-ethyl, 13-isopropyl and 13-butyl derivatives of 17α-ethynyl-17-hydroxygona-4,8(14),9-trien-3-one are respectively obtained.

The foregoing example illustrates a method of preparing the 17α-ethynyl derivatives of 13-alkyl-17-hydroxygona-4,8(14),9-trien-3-one, which may be represented by the following formula:

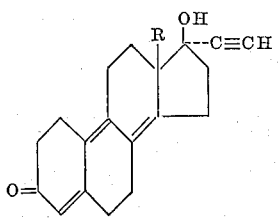

wherein R is preferably an alkyl radical having from 1 to 5 carbon atoms.

EXAMPLE 10

Using the same procedure as in Example 9, acetylene is reacted with the 13-hydro, 13-allyl, 13-difluoromethyl, 13-trifluoromethyl and 13-alkoxymethyl derivatives of gona-4,8(14),9-triene-3,17-dione to yield, respectively, the corresponding 13-hydro, 13-allyl, 13-difluoromethyl, 13-trifluoromethyl and 13-alkoxymethyl derivatives of 17α-ethynyl-17-hydroxygona-4,8(14),9-trien-3-one.

EXAMPLE 11

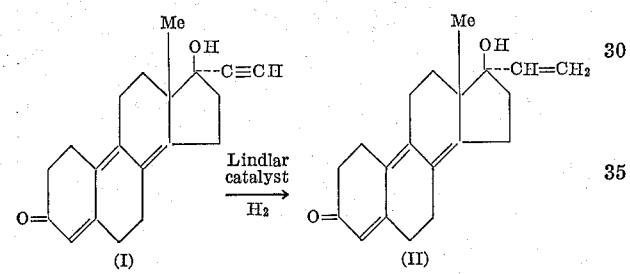

A solution of 200 mg. of 13-methyl-17α-ethynyl-17-hydroxygona-4,8(14),9-trien-3-one (I) in 10 ml. of ethylacetate is reduced with hydrogen in the presence of 25 mg. of Lindlar catalyst (lead deactivated palladium on a calcium carbonate support) at atmospheric pressure until one stoichiometric equivalent of hydrogen has been taken up. The product is filtered and the filtrate concentrated in vacuo. The concentrate is chromatographed on silica gel and eluted with ether-petroleum ether mixtures to yield 13 - methyl - 17α - vinyl - 17 - hydroxygona - 4,8(14),9-trien-3-one (II).

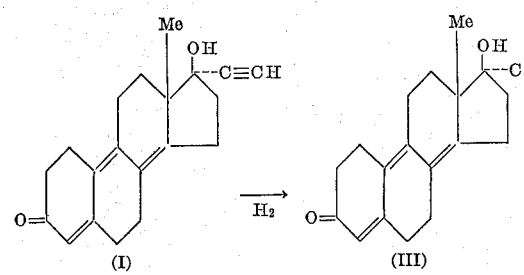

A solution of 200 mg. of (I) in 10 ml. of dioxane is reduced with hydrogen in the presence of 25 mg. of palladium on barium carbonate at atmospheric pressure until two stoichiometric equivalents of hydrogen have been taken up. The product is filtered, and the filtrate concentrated in vacuo and chromatographed on silica gel. Elution with ether-petroleum ether mixtures yields 13-methyl-17α - ethyl - 17 - hydroxygona - 4,8(14),9 - trien - 3 - one (III).

The foregoing example illustrates a method of preparing the 17α-vinyl and 17α-ethyl derivatives of the novel 17 - hydroxygona - 4,8(14),9 - trien - 3 - one compounds of this invention by the reduction of the corresponding 17α - ethynyl - 17 - hydroxygona - 4,8(14),9-trien-3-ones. Using the same procedure, the 13-hydro, 13-difluoromethyl, 13-trifluoromethyl and 13-alkoxymethyl derivatives of 17α-ethynyl-17-hydroxygona-4,8(14),9-trien-3-one are reduced to the corresponding 17α-vinyl and 17α-ethyl compounds.

EXAMPLE 12

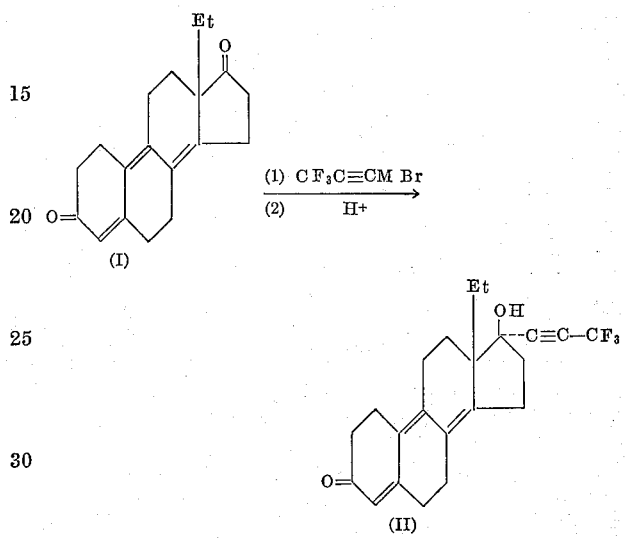

A 50 ml. round bottom flask is fitted with a Dry-Ice condenser, a dropping funnel and a magnetic stirrer. After the addition of 210 mg. of metallic magnesium, the entire system is purged with nitrogen gas and flame dried. 5 ml. of dry ether is then added, followed by the dropwise addition, with sit stirring, of 1 ml. of ethyl bromide in 5 ml. of ether. After all the magnesium has reacted with the ethyl bromide, 5 ml. of trifluoropropyne (prepared by the reaction of propiolic acid with sulfur tetrafluoride) is distilled into the reaction flask and the mixture refluxed under Dry-Ice-acetone for one hour. The Dry-Ice-acetone condenser is then removed, the reaction allowed to warm to room temperature and the excess gaseous trifluoropropyne distilled off. A solution of 1.0 g. of 13-ethyl-gona-4,8(14),9-triene-3,17-dione (I) in 5 ml. of benzene and 5 ml. of ether is added and the mixture stirred for 16 hours at room temperature. Water is then added and the mixture extracted with ether. The ether extracts are washed with water until the washings are weakly basic, dried over sodium sulfate and concentrated in vacuo. The residue is chromatographed on silica gel and eluted with ether-petroleum ether mixtures to yield 13 - ethyl - 17α-trifluoromethylethynyl-17-hydroxy-gona-4,8(14),9-trien-3-one (II).

In accordance with the above procedures, but starting with the 13-methyl, 13-isopropyl, 13-n-propyl, 13-butyl, 13-hydro, 13-allyl, 13-difluoromethyl, 13-trifluoromethyl and 13-alkoxymethyl derivatives of gona-4,8(14),9-triene-3,17-dione in place of (I), the corresponding 13-methyl, 13-isopropyl, 13-n-propyl, 13-butyl, 13-hydro, 13-allyl, 13-difluoromethyl, 13-trifluoromethyl and 13-alkoxymethyl derivatives of 17α-trifluoromethylethynyl-17-hydroxygona-4,8(14),9-trien-3-one, respectively, are obtained.

EXAMPLE 13

This example illustrates a method of preparing the novel 13-R-17α-hydro-17-hydroxygona-4,8(14),9-trien-3-one steroids of this invention by the reduction of the corresponding 13-R-gona-4,8(14),9-triene-3,17-dione. Exemplifying the preparation of the 13-methyl-derivative, the reaction may be illustrated as follows:

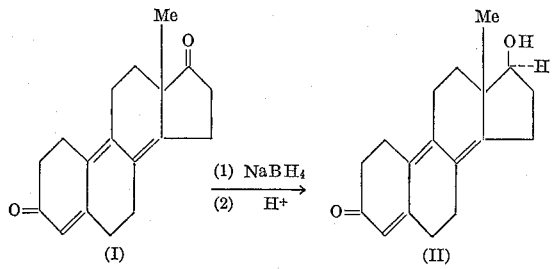

A solution of 100 mg. of 13-methyl-gona-4,8(14),9-triene-3,17-dione (I) in 20 ml. methanol is treated with 20 mg. sodium borohydride for 1 hour at 0° C. A few drops of acetic acid are added and the solution is concentrated to dryness. The residue is extracted with benzene and concentrated in vacuo, followed by chromatography on silica gel and elution with ether-petroleum ether mixtures to yield 13-methyl-17α-hydro-17-hydroxygona-4,8(14),9-trien-3-one (II).

In accordance with the above procedures, the reduction of the 13-ethyl, 13-isopropyl, 13-n-propyl, 13-butyl, 13-hydro, 13-allyl, 13-difluoromethyl, 13-trifluoromethyl and 13-alkoxymethyl derivatives of gona-4,8(14),9-triene-3,17-dione yields, respectively, the corresponding 13-ethyl, 13-isopropyl, 13-n-propyl, 13-butyl, 13-hydro, 13-allyl, 13-difluoromethyl, 13-trifluoromethyl and 13-alkoxymethyl derivatives of 17α-hydro-17-hydroxygona-4,8(14),9-trien-3-one.

EXAMPLE 14

This example illustrates a method of preparing the novel 17α-methyl-17-hydroxygona-4,8(14),9-trien-3-one steroids of this invention by the Grignard methylation of the corresponding gona-4,8(14),9-triene-3,17-diones. Exemplifying the preparation of the 13-methyl derivative, the reaction may be represented by the following equation:

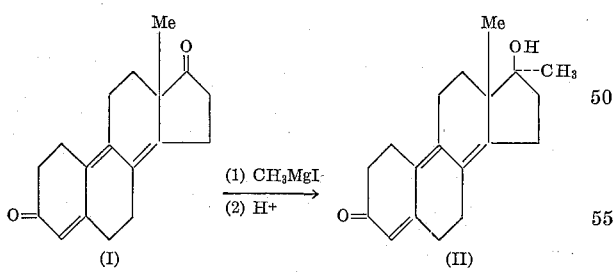

A solution of 300 mg. of 13-methyl-gona-4,8(14),9-triene-3,17-dione (I) in 20 cc. of ether is treated with 1.4 ml. of 1 N methylmagnesium iodide in ether and the mixture is stirred for 1 hour at room temperature. The mixture is then diluted with water, and the resulting product (II) is taken up in ether, dried and concentrated in vacuo. Chromatography over silica gel and elution with ether-petroleum ether mixtures yields 13-methyl-17α-methyl-17-hydroxygona-4,8(14),9-trien-3-one (II).

In accordance with the above procedure, but substituting equivalent quantities of the respective gona-4,8(14),-triene-3,17-diones of Example 6 for the 13-methyl-gona-4,8(14),9-triene-3,17-dione above, there is obtained as products the corresponding 13-R-17α-methyl-17-hydroxygona-4,8(14),9-trien-3-ones.

EXAMPLE 15

Using the same procedures as in Example 14, but substituting an allylmagnesium halide for the Grignard reagent therein, there are obtained as products the corresponding 13-R-17α-allyl-17-hydroxygona-4,8(14),9-trien-3-one steroids which may be represented by the following formula:

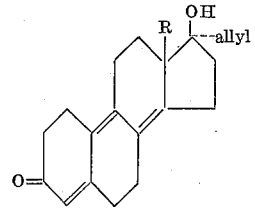

wherein R is a hydrogen atom and a lower alkyl, allyl, difluoromethyl, trifluoromethyl and alkoxymethyl radical.

EXAMPLE 16

Using the same procedures as in Example 14, but substituting a methallylmagnesium halide for the Grignard reagent therein, there are obtained as products the corresponding 13-R-17α-methallyl-17-hydroxygona-4,8(14),9-trien-3-one steroids which may be represented by the following formula:

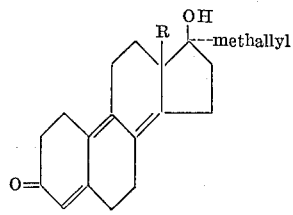

wherein R is a hydrogen atom and a lower alkyl, allyl, difluoromethyl, trifluoromethyl and alkoxymethyl radical.

EXAMPLE 17

Using the same procedures as in Example 14, but substituting a vinylmagnesium halide for the Grignard reagent therein, there are obtained as products the corresponding 13 - R - 17α - vinyl-17-hydroxygona-4,8(14),9-trien-3-one steroids which may be represented by the following formula:

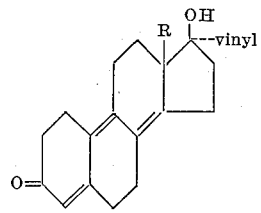

wherein R is a hydrogen atom and a lower alkyl, allyl, difluoromethyl, trifluoromethyl and alkoxymethyl radical.

EXAMPLE 18

Using the same procedures as in Example 14, but substituting an ethynylmagnesium halide for the Grignard reagent therein, there are obtained as products the corresponding 13 - R - 17α - ethynyl - 17 - hydroxygona - 4,8(14),9-trien-3-one which may be represented by the following formula:

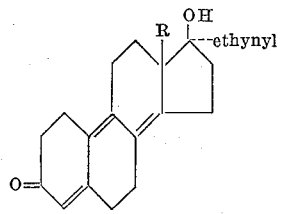

wherein R is a hydrogen atom and a lower alkyl, allyl, difluoromethyl, trifluoromethyl and alkoxymethyl radical.

EXAMPLE 19

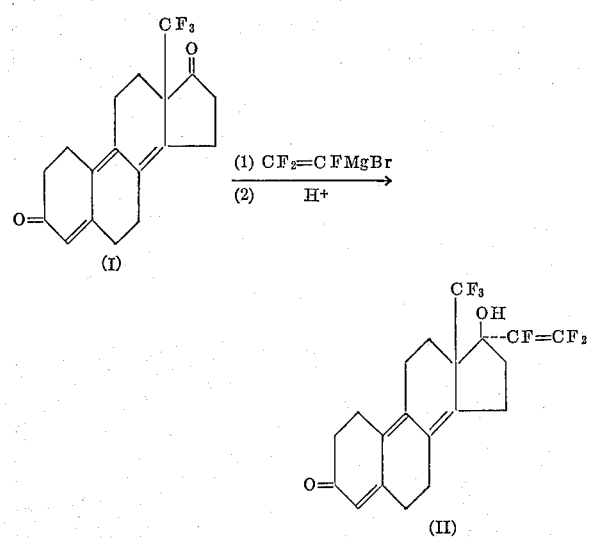

A solution of 300 mg. of 13-trifluoromethylgona-4,8(14),9-triene-3,17-dione (I) in 20 ml. of tetrahydrofuran is treated with 1.4 ml. of a 1 N solution of trifluorovinylmagnesium bromide in tetrahydrofuran. The solution is stirred at room temperature for 3 hours and then diluted with water. The product (II) is extracted with ether and chromatographed on silica gel. Elution with ether-petroleum ether mixtures yields 13-trifluoromethyl-17α-trifluorovinyl - 17 - hydroxygona - 4,8(14),9 - triene - 3-one (II).

In accordance with the above procedure, but substituting equivalent quantities of the other 13-R-gona-4,8(14),9-triene-3,17-diones of Example 6 for the 13-trifluoromethyl compound above, there are obtained as products the corresponding 13-R-17α-trifluorovinyl-17-hydroxygona-4,8(14),9-trien-3-ones.

The foregoing example illustrates a method of preparing the novel 17α-trifluorovinyl-17-hydroxygona-4,8(14),9-trien-3-ones of this invention. In general terms, the process involves the interaction of the corresponding 13-R-gona-4,8(14),9-triene-3,17-dione compound with trifluorovinylmagnesium bromide, a Grignard reagent, according to the following equation:

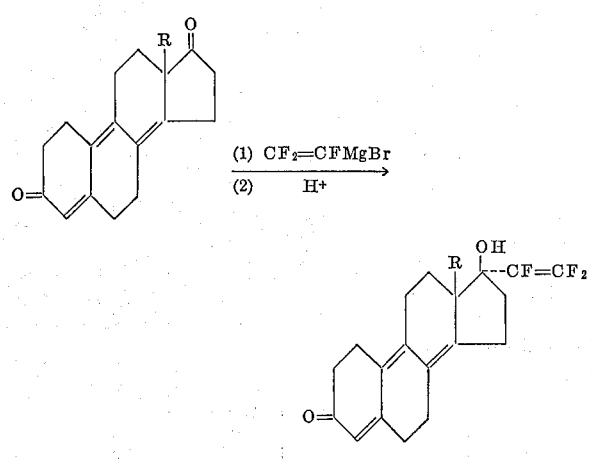

EXAMPLE 20

This example illustrates a method of preparing the novel 17α - alkyl - 17 - hydroxygona - 4,8(14),9 - trien-3-one steroids of this invention using alkyllithium as the 17-keto additive. Exemplifying the preparation of the 13-methyl-17α-ether derivative, the reaction may be represented by the following equation:

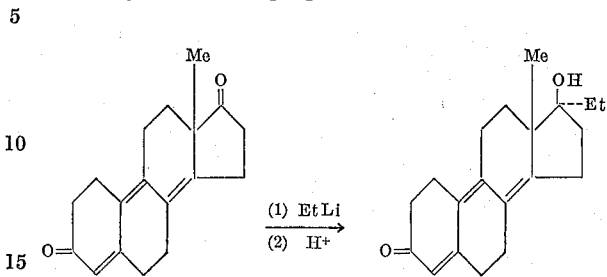

A solution of 300 mg. of 13-methyl-gona-4,8(14),9-triene-3,17-dione in 20 cc. of ether is treated with 1.4 ml. of 1 N ethyllithium in ether and the mixture is stirred for 1 hour at room temperature. The mixture is then diluted with water, and the resulting product is taken up in ether, dried and concentrated in vacuo. Chromatography over silica gel and elution with ether-petroleum ether mixtures yields 13-methyl-17α-ethyl-17-hydroxy-gona-4,8(14),9-trien-3-one.

In accordance with the foregoing procedure, but substituting equivalent quantities of methyllithium, propyllithium and butyllithium for the ethyllithium above, there are obtained as products the corresponding 17α-methyl, 17α-propyl and 17α-butyl derivatives, respectively.

In accordance with the foregoing procedures, but substituting equivalent quantities of the gona-4,8(14),9-triene-3,17-diones of Example 6 for the 13-methyl-gona-4,8(14),9-triene-3,17-dione used above, there are obtained as products the corresponding 17α-alkyl-17-hydroxygona-4,8(14),9-trien-3-ones.

EXAMPLE 21

This example illustrates a method of converting the instant 13 - R-17α-R'-17-hydroxygona-4,8(14),9-trien-3-ones to the corresponding 17β-alkanoyl ester derivatives thereof.

One-hundred mg. of 13-methyl-17α-chloro-ethynyl-17-hydroxygona-4,8(14),9-trien-3-one are heated with 1 cc. of acetic anhydride and 1.2 cc. of pyridine on a steam bath overnight. The reaction mixture is then poured onto ice and extracted with chloroform. The extract is washed with water and concentrated. The concentrate is chromatographed over acid-washed alumina and eluted with mixtures of ether and petroleum ether to give 13-methyl-17α-chloroethynyl-17β-acetoxygona-4,8(14),9-trien-3-one.

Various changes and modifications may be made in carrying out the present invention without departing from the spirit and scope thereof. Insofar as these changes and modifications are within the purview of the annexed claims, they are to be considered as part of our invention.

We claim:
1. 13-lower alkyl-gona-4,8(14),9(10)-triene-3,17-dione.
2. 13-allyl-gona-4,8(14),9(10)-triene-3,17-dione.
3. 13-lower alkoxymethyl-gona-4,8(14),9(10)-triene-3,17-dione.
4. 13-lower alkyl-17α-chlorethynyl-17-hydroxygona-4,8,(14),9(10)-trien-3-one.
5. 13-lower alkyl-17α-ethynyl-17-hydroxygona-4,8(14),9(10)-trien-3-one.
6. 13 - lower alkyl - 17α-trifluoromethylethynyl-17-hydroxygona-4,8(14),9(10)-trien-3-one.
7. 13-lower alkyl-17α-lower alkyl-17-hydroxygona-4,8(14),9(10)-trien-3-one.
8. 13-lower alkyl-17α-trifluorovinyl-17-hydroxygona-4,8(14),9(10)-trien-3-one.
9. 13-lower alkyl-17α-chloroethynyl-17β-alkanoyloxy-gona-4,8(14),9(10)-trien-3-one.

10. 13-methyl-17α-chloroethynyl-17β-acetoxygona-4,8(14),9(10)-trien-3-one.

References Cited by the Examiner
UNITED STATES PATENTS
2,179,809  11/1939  Bockemüler _____ 260—397

OTHER REFERENCES
Fieser et al.: "Steroids" (1959), Reinhold Publishing Corp., page 621.
Viehe: "Chem. Ber." (1959), vol. 92, page 1270, 1950.

LEWIS GOTTS, *Primary Examiner.*